United States Patent [19]

Yamamoto et al.

[11] Patent Number: 5,110,680
[45] Date of Patent: May 5, 1992

[54] MAGNETIC RECORDING MEDIUM

[75] Inventors: Yoshinori Yamamoto; Kenji Sumiya, both of Osaka, Japan

[73] Assignee: Hitachi Maxell, Ltd., Osaka, Japan

[21] Appl. No.: 241,254

[22] Filed: Sep. 7, 1988

[51] Int. Cl.$^5$ ............................................. G11B 23/00
[52] U.S. Cl. ................................. 428/413; 428/694; 428/900
[58] Field of Search .................. 428/425.7, 694, 900, 428/413

[56] References Cited

U.S. PATENT DOCUMENTS

| | | | |
|---|---|---|---|
| 4,600,521 | 7/1986 | Nakamura et al. | 428/694 |
| 4,707,410 | 11/1987 | Hata et al. | 428/900 |
| 4,707,411 | 11/1987 | Nakayama et al. | 428/900 |
| 4,748,084 | 5/1988 | Hata et al. | 428/900 |
| 4,784,914 | 11/1988 | Matsufuji et al. | 428/695 |

*Primary Examiner*—Paul J. Thibodeau
*Attorney, Agent, or Firm*—Birch, Stewart, Kolasch & Birch

[57] ABSTRACT

A magnetic recording medium with good durability and electromagnetic conversion properties which comprises a substrate and a magnetic layer formed thereon containing magnetic powder and a binder component which comprises a glycidyl group-containing binder resin and a phosphated binder resin such that the dispersability of the magnetic powder in the binder component is enhanced.

2 Claims, No Drawings

MAGNETIC RECORDING MEDIUM

BACKGROUND OF THE INVENTION

1. Field of the Invention

The present invention relates to a magnetic recording medium such as a magnetic disc or a magnetic tape, and more particularly, it relates to a magnetic recording medium which has good dispersibility of magnetic powder, electromagnetic conversion properties and durability.

2. Description of the Related Art

Generally, a magnetic recording medium is produced by coating a substrate such as a polyester film with a magnetic paint which comprises magnetic powder, a binder component, an organic solvent and other necessary components, and then drying. It is desired to use a binder component which gives good dispersibility of the magnetic powder, electromagnetic conversion properties, such as high sensitivity of the recording magnetic medium, and good durability.

Many studies of binder resins have been carried out. For example, a functional group such as a phosphate ester group, sulfone group or hydroxyl group was introduced as a vinyl chloride-vinyl acetate copolymer so as to improve the dispersibility of the magnetic powder (cf. Japanese Patent Kokai Publication No. 44227/1982).

Although the binder resin such as the vinyl chloride-vinyl acetate copolymer which has such a functional group achieves good dispersibility of the magnetic powder, it may have poor durability due to a low polymerization degree and poor cross-linking.

SUMMARY OF THE INVENTION

An object of the present invention is to provide a magnetic recording medium which has good durability and electromagnetic conversion properties.

A further object of the present invention is to provide a magnetic recording medium wherein the dispersion of the magnetic powder in the binder component of the magnetic layer is enhanced.

This and other objects are accomplished in accordance with the present invention by a magnetic recording medium comprising a substrate and a magnetic layer formed thereon containing magnetic powder and a binder component which comprises a glycidyl group-containing binder resin and a phosphated binder resin.

DETAILED DESCRIPTION OF THE INVENTION

In the present invention, since the glycidyl group-containing binder resin and the phosphated binder resin are used as the binder components, they are crosslinked and improve the mechanical strength of the magnetic recording layer and the durability, sufficiently.

Specific examples of the glycidyl group-containing binder resin used according to the present invention are a vinyl chloride or urethane resin which has a glycidyl group, and epoxy resin. Examples of the available glycidyl group-containing binder resin are Epikote 1001 and Epikote 1007 manufactured by Shell Chemical, Araldite 6071 and Araldite 6097 manufactured by Ciba Geigy, MR 110 and MR 120 manufactured by Nippon Zeon Co, Ltd., and OEBR-100 and OEBR-1010 manufactured by Tokyo Ohka Kogyo Co., Ltd. Since the glycidyl group-containing binder resin has a high reactivity, when used together with the phosphated binder resin, it reacts and cross-links with the phosphated binder resin, and increases the mechanical strength of the magnetic layer to improve the durability. Particularly, the glycidyl group-containing vinyl chloride resin gives good dispersibility of the magnetic powder and has increased stability due to the presence of the glycidyl group. When the glycidyl group-containing vinyl chloride resin is used together with the phosphated binder resin, it improves the durability of the magnetic layer and the dispersibility of the magnetic powder, and it gives the good electromagnetic conversion properties. The content of the glycidyl group in the glycidyl-group-containing binder resin is preferably such that an epoxy value of the glycidyl-group-containing binder resin is from 1.5 to 40 % by weight.

Specific examples of the phosphated binder resin used together with the glycidyl group-containing binder resin are a phosphated vinyl chloride resin, a phosphated urethane resin and a phosphated phenoxy resin. The phosphated binder resin is prepared by conventional procedures for phosphating, for example, by reacting a compound having an alcoholic hydroxyl group with phosphoric anhydride. Since the phosphated binder resin has a high reactivity, when used together with the glycidyl group-containing binder resin, it reacts and cross-links with the glycidyl group-containing binder resin, and a strong magnetic layer is formed and the durability of the magnetic layer is improved sufficiently. The phosphated binder resin improves the dispersibility of the magnetic powder when a phosphate esterification degree is adjusted. When it is used together with the glycidyl group-containing binder resin, it improves the durability of the magnetic layer and the dispersibility of the magnetic powder and, therefore, good electromagnetic conversion properties are obtained. The content of the phosphate ester group in the phosphated binder resin is preferably such that an ester value of the phosphated binder resin is from 0.2 to 21 % by weight.

A weight ratio of the glycidyl group-containing binder resin to the phosphated binder resin is preferably from 2:8 to 8:2. When the weight ratio of the glycidyl group-containing binder resin is larger than 8:2, gelation occurs. When it is smaller than 2:8, good dispersibility cannot be achieved.

In addition to the glycidyl group-containing binder resin and the phosphated binder resin, other binder resins can be used. An isocyanate compound is preferable. Since the isocyanate compound cross-links with the functional groups of the glycidyl group-containing binder resin and the phosphated binder resin, the mechanical strength and the durability of the magnetic layer are further improved.

The magnetic recording medium according to the present invention can be prepared by conventional methods, for example, by applying on a substrate such as a polyester film, a magnetic paint which comprises the magnetic powder, the glycidyl group-containing binder resin, the phosphated binder resin, the other binder resins, an organic solvent and other additives by conventional means such as a spray coating or a roller coating, and then drying.

As the magnetic powder, suitable are conventional magnetic metal powder, for example, $\gamma$-$Fe_2O_3$ powder, $Fe_3O_4$ powder, intermediate oxide powder of $\gamma$-$Fe_2O_3$ and $Fe_3O_4$, cobalt-containing $\gamma$-$Fe_2O_3$ powder, cobalt-containing $Fe_3O_4$ powder, $CrO_2$ powder, Fe powder, Co powder, Ni powder, alloy powder thereof, alloy powder containing at least one element such as Al, Cr, Mn, Si or Zn in the above powder, and barium ferrite powder.

As the organic solvent, suitable are methyl isobutyl ketone, methyl ethyl ketone, cyclohexanone, toluene, ethyl acetate, tetrahydrofuran, dioxane, dimethyl formamide and mixtures thereof.

PREFERRED EMBODIMENTS

The present invention will be hereinafter explained further in detail by the following Examples.

EXAMPLE 1

The following components were mixed and dispersed homogeneously at a line speed of 400 m/sec. for 5 hours by a sand grinder, and filtered by a filter to prepare a magnetic paint.

| | |
|---|---|
| Co-containing $\gamma$-Fe$_2$O$_3$ powder | 80 parts by weight |
| Phosphated vinyl chloride-vinyl acetate-vinyl alcohol copolymer | 5 parts by weight |
| Epoxy-containing vinyl chloride-vinyl acetate-vinyl alcohol copolymer | 5 parts by weight |
| Urethane elastomer (Nipporan 2301, manufactured by Nihon Polyurethane Kogyo) | 8 parts by weight |
| Low molecular weight trifunctional isocyanate compound (Colonate L manufactured by Nihon Polyurethane Kogyo) | 2 parts by weight |
| Carbon black | 10 parts by weight |
| Alumina | 5 parts by weight |
| Myristic acid | 5 parts by weight |
| n-Butyl stearate | 4 parts by weight |
| Cyclohexanone | 100 parts by weight |
| Toluene | 100 parts by weight |

The magnetic recording paint was coated on a polyester film of 14 μm in thickness, dried and surface treated to form the magnetic layer of 5 μm in thickness. A product was cut in a desired width to prepare a magnetic tape.

EXAMPLE 2

A magnetic tape was prepared in the same manner as in Example 1 except that the phosphated vinyl chloride-vinyl acetate-vinyl alcohol copolymer was used in an amount of 7 parts by weight instead of 5 parts by weight and the epoxy-containing vinyl chloride-vinyl acetate-vinyl alcohol copolymer was used in an amount of 3 parts by weight instead of 5 parts by weight.

EXAMPLE 3

A magnetic tape was prepared in the same manner as in Example 1 except that the phosphated vinyl chloride-vinyl acetate-vinyl alcohol copolymer was used in an amount of 3 parts by weight instead of 5 parts by weight and the epoxy-containing vinyl chloride-vinyl acetate-vinyl alcohol copolymer was used in an amount of 7 parts by weight instead of 5 parts by weight.

COMPARATIVE EXAMPLE 1

A magnetic tape was prepared in the same manner as in Example 1 except that the phosphated vinyl chloride-vinyl acetate-vinyl alcohol copolymer was used in an amount of 10 parts by weight instead of 5 parts by weight and the epoxy-containing vinyl chloride-vinyl acetate-vinyl alcohol copolymer was not used.

COMPARATIVE EXAMPLE 2

A magnetic tape was prepared in the same manner as in Example 1 except that the epoxy-containing vinyl chloride-vinyl acetate-vinyl alcohol copolymer was used in an amount of 10 parts by weight instead of 5 parts by weight and the phosphated vinyl chloride-vinyl acetate-vinyl alcohol copolymer was not used.

COMPARATIVE EXAMPLE 3

A magnetic tape was prepared in the same manner as in Example 1 except that 10 parts by weight of a vinyl chloride-vinyl acetate-vinyl alcohol copolymer (VAGH manufactured by U. C. C., USA) was used instead of the phosphated vinyl chloride-vinyl acetate-vinyl alcohol copolymer and the epoxy-containing vinyl chloride-vinyl acetate-vinyl alcohol copolymer was not used.

Each magnetic recording tape prepared in Examples and Comparative Examples was tested on a residual magnetic flux density, a squareness ratio, a surface roughness and a still life.

The still life was determined by recording and reproducing the magnetic tape at a still mode in a video tape recorder VT-8000E manufactured by Hitachi, Ltd. and measuring a period of time in which an output power was decreased by 6 dB from an original output power.

As the surface roughness, a center line average height (Ra) of each magnetic tape was measured and it was expressed by $$-20 \log \left( \frac{Ra \; (\mu m)}{Ra \; \text{in Comparative Example 3} \; (\mu m)} \right)$$

The results are shown in Table.

TABLE

| Example No. | Residual flux magnetic density (G) | Squareness ratio Br/Bm | Surface roughness | Still life (min.) |
|---|---|---|---|---|
| 1 | 1,525 | 0.82 | +0.4 | 180 |
| 2 | 1,500 | 0.80 | +0.5 | 180 |
| 3 | 1,510 | 0.81 | +0.3 | 180 |
| Comp. 1 | 1,505 | 0.81 | +0.4 | 120 |
| Comp. 2 | 1,510 | 0.80 | +0.5 | 110 |
| Comp. 3 | 1,320 | 0.75 | 0 | 150 |

The results of Table 1 show that the magnetic tapes according to the present invention (Examples 1 to 3) have at least the same residual magnetic flux density, squareness ratio and surface roughness and a longer still life in comparison with the conventional magnetic tapes (Comparative Examples 1 to 3) and they have good electromagnetic conversion properties and durability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising a substrate and a magnetic layer formed thereon containing a magnetic powder and a binder resin component which comprises a blend of a glycidyl group-containing vinyl-chloride resin and a phosphated vinyl-chloride resin said binder resin component having a weight ratio of said glycidyl group-containing vinyl-chloride resin to said phosphated vinyl-chloride resin of from 2:8 to 8:2.

2. The magnetic recording medium according to claim 1, wherein said glycidyl group-containing vinyl-chloride resin has a glycidyl-group content expressed in terms of an epoxy value of from 1.5 to 40% by weight.

* * * * *